(12) United States Patent
Lening

(10) Patent No.: US 8,776,427 B1
(45) Date of Patent: Jul. 15, 2014

(54) FISH ATTRACTION DEVICE

(71) Applicant: George Lening, Mead, OK (US)

(72) Inventor: George Lening, Mead, OK (US)

(*) Notice: Subject to any disclaimer, the term of this patent is extended or adjusted under 35 U.S.C. 154(b) by 0 days.

(21) Appl. No.: 13/794,348

(22) Filed: Mar. 11, 2013

(51) Int. Cl.
*A01K 85/01* (2006.01)
*A01K 97/00* (2006.01)

(52) U.S. Cl.
USPC ............. 43/26.1; 43/4; 43/42.31; 416/235; 416/236 R

(58) Field of Classification Search
USPC ............. 43/26.1, 26.2, 42.31, 3, 2, 4; 440/49; 216/183, 245 A, 235, 175, 228, 236; 416/183, 245 A, 235, 175, 228, 236, 416/236 R, 236 A; 446/153, 156–158, 160, 446/162–165
See application file for complete search history.

(56) References Cited

U.S. PATENT DOCUMENTS

| | | | | |
|---|---|---|---|---|
| 28,688 A * | 6/1860 | Porter | ........................ | 416/236 A |
| 533,956 A * | 2/1895 | Hughes | ...................... | 416/236 R |
| 636,106 A * | 10/1899 | Biddle | ................................ | 43/3 |
| 652,123 A * | 6/1900 | Lavigne | .......................... | 416/235 |
| 695,389 A * | 3/1902 | Hammond | ...................... | 416/175 |
| 788,047 A * | 4/1905 | Holz et al. | ....................... | 43/26.1 |
| 997,587 A * | 7/1911 | Swenson | ..................... | 416/236 R |
| 1,055,947 A * | 3/1913 | Schwartzberg | ............ | 416/236 R |
| D58,732 S * | 8/1921 | Field | .............................. | D23/413 |
| 1,413,296 A * | 4/1922 | Spreekmeester | .......... | 416/236 R |
| 1,422,109 A * | 7/1922 | Lambert | ........................ | 416/235 |
| 1,597,175 A * | 8/1926 | Boening | ................... | 416/236 R |
| 1,906,791 A * | 5/1933 | Grossmann | ..................... | 43/26.2 |
| 1,946,641 A * | 2/1934 | Sisco | ............................. | 43/42.31 |
| 2,026,689 A * | 1/1936 | Leinweber | ..................... | 416/228 |
| 2,122,836 A * | 7/1938 | Gegerfeldt | ....................... | 43/26.1 |
| 2,157,349 A * | 5/1939 | Rosner | .............................. | 440/49 |
| 2,193,616 A * | 3/1940 | Baumann | .................. | 416/236 R |
| 2,229,175 A * | 1/1941 | Johnson | ............................. | 43/3 |
| 2,230,919 A * | 2/1941 | Wick | ........................... | 43/42.13 |
| 2,327,453 A * | 8/1943 | Presser | ..................... | 416/236 R |
| 2,426,742 A * | 9/1947 | Pawlowski | ...................... | 440/49 |
| 2,443,040 A * | 6/1948 | Jones | .................................. | 43/3 |
| 2,448,523 A * | 9/1948 | Flbiger | .......................... | 43/26.2 |
| 2,485,053 A * | 10/1949 | Layfield | ....................... | 43/42.13 |
| 2,517,495 A * | 8/1950 | Kneece | ........................... | 43/26.2 |
| 2,521,852 A * | 9/1950 | Jones | ............................. | 43/26.2 |
| 2,814,906 A * | 12/1957 | Orvis | ............................ | 446/165 |
| 2,816,391 A * | 12/1957 | Michael | ......................... | 43/26.2 |
| 2,819,553 A * | 1/1958 | Fultz | ............................ | 43/42.12 |
| 2,922,244 A * | 1/1960 | Benner, Sr. | ..................... | 43/26.2 |
| 2,999,329 A * | 9/1961 | Pankuch | ....................... | 43/42.31 |
| 3,007,276 A * | 11/1961 | Lidert | ............................. | 43/26.2 |

(Continued)

*Primary Examiner* — Darren W Ark
(74) *Attorney, Agent, or Firm* — Stetina Brunda Garred & Brucker

(57) ABSTRACT

An apparatus for attracting fish is disclosed. The apparatus has a motor with rotating driveshaft that defines a rotational axis substantially parallel to a surface of a body of water. A housing encloses the motor, and the driveshaft extends therefrom. There is an impeller with a hub axially aligned with and coupled to the driveshaft. The impeller has one or more flat planar blades, each defined by a trailing edge and a leading edge and extending radially from the hub in an orthogonal relationship to the rotational axis of the driveshaft without pitch. A proximate end of the blades is fixed to the hub an opposed distal end includes a cupped paddle projecting therefrom with a paddle leading surface and a paddle trailing surface. Turbulence and cavitation is generated by the impeller, and the visual and audible side effects thereof are simulative of fish feeding activity.

17 Claims, 3 Drawing Sheets

(56) References Cited

U.S. PATENT DOCUMENTS

| | | | |
|---|---|---|---|
| 3,274,410 A * | 9/1966 | Boivie | 310/62 |
| 3,308,574 A * | 3/1967 | Schneider | 446/153 |
| 3,465,464 A * | 9/1969 | De Berry | 43/26.2 |
| 3,488,876 A * | 1/1970 | Lowrance | 43/4 |
| 3,599,369 A * | 8/1971 | Carlson | 43/26.1 |
| 3,728,811 A * | 4/1973 | Weimer | 43/26.2 |
| 3,812,812 A * | 5/1974 | Hurwitz | 440/49 |
| 4,135,323 A * | 1/1979 | Esten | 43/42.31 |
| 4,375,337 A * | 3/1983 | Yerger | 43/3 |
| 4,435,914 A * | 3/1984 | Norman | 43/42.31 |
| 4,581,841 A * | 4/1986 | Gish | 43/26.2 |
| 4,620,385 A * | 11/1986 | Carranza et al. | 43/3 |
| 4,662,823 A * | 5/1987 | Cooke | 416/228 |
| 4,801,281 A * | 1/1989 | Govan | 440/49 |
| 4,904,159 A * | 2/1990 | Wickoren | 416/183 |
| 5,016,386 A | 5/1991 | Lamonica et al. | |
| 5,105,573 A * | 4/1992 | Mays | 43/26.2 |
| 5,121,568 A | 6/1992 | Lindmeyer | |
| 5,125,799 A * | 6/1992 | Sato et al. | 416/183 |
| 5,426,883 A * | 6/1995 | Roberts | 43/42.31 |
| 5,566,497 A * | 10/1996 | Oesterreich | 43/42.31 |
| 5,694,714 A * | 12/1997 | Basso et al. | 43/26.2 |
| 5,809,683 A * | 9/1998 | Solomon | 43/3 |
| 5,930,936 A * | 8/1999 | Parr et al. | 43/3 |
| 6,058,644 A * | 5/2000 | Irwin et al. | 43/26.2 |
| 6,079,140 A * | 6/2000 | Brock, IV | 43/3 |
| 6,321,480 B1 * | 11/2001 | Solomon | 43/3 |
| 6,339,893 B1 * | 1/2002 | Solomon | 43/3 |
| 6,339,894 B1 * | 1/2002 | Solomon | 43/3 |
| 6,427,375 B1 * | 8/2002 | Hair et al. | 43/17.1 |
| 6,508,029 B2 * | 1/2003 | Grindley | 43/42.46 |
| 6,536,155 B1 * | 3/2003 | VanRisseghem | 43/42.13 |
| 6,562,206 B2 * | 5/2003 | Showcatally | 440/49 |
| 6,581,319 B2 | 6/2003 | West | |
| 6,591,543 B2 * | 7/2003 | Sabine | 43/42.11 |
| 6,665,976 B2 | 12/2003 | West | |
| 6,910,294 B1 | 6/2005 | Talbert | |
| 6,925,747 B1 * | 8/2005 | Swanson | 43/26.2 |
| 6,955,004 B2 * | 10/2005 | Phipps | 43/42.31 |
| 7,043,865 B1 * | 5/2006 | Crowe | 43/3 |
| 7,472,508 B2 * | 1/2009 | Myers, IV | 43/26.1 |
| 7,562,489 B2 * | 7/2009 | Turner | 43/17.6 |
| 7,788,838 B2 * | 9/2010 | Anthony | 43/3 |
| 7,941,963 B2 * | 5/2011 | Myers, IV | 43/3 |
| 8,550,782 B2 * | 10/2013 | Hoskins | 416/235 |
| 2005/0042945 A1 * | 2/2005 | Mathers | 440/49 |
| 2005/0155273 A1 | 7/2005 | Phipps | |
| 2010/0104448 A1 * | 4/2010 | Moore | 416/235 |
| 2012/0204467 A1 * | 8/2012 | Palmer et al. | 43/4.5 |
| 2013/0036654 A1 | 2/2013 | Goosey | |

* cited by examiner

FISH ATTRACTION DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to apparatuses for improving the chances of catching fish, and more particularly to devices for attracting and luring fish by mimicking group feeding activity at the water surface based on mechanical agitation of water with concomitant sonic output.

2. Related Art

Fishing has been pursued for tens of thousands of years since at least to the Paleolithic Age. Throughout much of its history, the primary purpose of fishing was for sustenance, though in many cases it was pursued for recreational or sporting reasons. A wide variety of practices fall under the general category of fishing, but the most popular variation is angling, in which a hook (also referred to as "angle") or other like tackle is attached to a rod by a line. The rod also typically includes a reel that stores, retrieves, and pays out the line. The hook may be dressed with bait or an artificial lure to persuade the fish to bite down upon the same, resulting in the capture of the fish. Being weighted with the bait, the hook, and perhaps sinkers and lures, the end of the fishing line not attached to reel is cast out to the water. After the bait or lure is initially taken, the angler sets the hook in the fish with a forceful movement of the rod and line. The line, and hence the fish, is retrieved by rewinding the reel. Other techniques that do not involve fishing rods and reels such as spear fishing, hand gathering, netting, and trapping are also utilized.

Practically any body of water can be home to fish, including oceans, rivers, streams, lakes, and ponds, and so there are numerous options with respect to location. Moreover, fish may be pursued from the shore or on the water using boats and other vessels. A variety of specialty equipment has been developed and adopted for different species and the most suitable pursuit techniques therefor.

Regardless of the techniques, locations, and modes of pursuit, one of the most significant challenges of fishing is finding the fish. To a novice, it may appear as though an encyclopedic knowledge of a body of water and how it may be affected by a combination of temperature and weather conditions, seasons, lunar cycles is a prerequisite for success. Furthermore, an in-depth understanding of the foraging and migration activities of the targeted fish, in concert with the aforementioned variable habitat conditions, may be needed to identify the specific locations within a body of water that would likely be the most fruitful. Although fishermen with extensive experience fishing a particular spot may intuitively evaluate these conditions and factors, because of the almost infinite variability, picking a fishing spot may at times seem like a black art. Examples are legion where, despite best efforts, a fishing trip concluded without even a single bite because fish could not be found, or were not pursued in a manner that attracted the fish.

Numerous developments in the art have attempted, with varying degrees of success, to minimize the uncertainty associated with locating fish, on one hand, and to maximize the chances of catching fish. One such area with constant development activity is the lure, the fundamental objective of which being the aural and/or visual simulation of species that are part of the normal diet of the fish being pursued. The simulated species include worms, amphibians, smaller fish, and insects. Lures may be limited in that they must be positioned at least somewhat close to the fish as they are to bite the hooks attached to the lure. Depending on the characteristics of the surrounding water, the visual and/or aural output from the lure may also be limited. Thus, casting skills that may not necessarily be possessed by novice, if not most fishermen may be required.

Another development is the electronic visualizer that employs sonar or radar to detect and show the position/depth of nearby fish. The visualization may assist fisherman in navigating to a location on the water where there may be a lot of fish, and to identify suitable depths for maximizing the opportunity to present the bait or lure. However, visualization may not be sufficient, particularly if the fisherman is immobile, and/or outside the range of the equipment (line length, etc.)

Additionally, there are electronic callers that emit particular sounds simulating underwater events such as attacks by predators, movement, and the like. The effectiveness of such devices have been limited most likely because fish, being living creatures that take in sensory inputs and alters behaviors in response, may not necessarily be "fooled" by the simulation. Accordingly, there is a need in the art for an improved and more effective fish attraction device.

BRIEF SUMMARY

In accordance with one embodiment of the present disclosure, an apparatus for attracting fish is disclosed. The apparatus may have a motor including a rotating driveshaft that defines a rotational axis that is substantially parallel to a surface of a body of water. Additionally, the apparatus may include a housing that encloses the motor, with the driveshaft extending therefrom. There may be an impeller with a hub that is axially aligned with and coupled to the driveshaft. The impeller may have one or more flat planar blades, each of which may be defined by a trailing edge and a leading edge. The flat planar blades may extend radially from the hub in an orthogonal relationship to the rotational axis of the driveshaft without pitch. Furthermore, the flat planar blades may have a proximate end that is fixed to the hub and an opposed distal end with a cupped paddle projecting from each of the flat planar blades. The cupped paddle may define a paddle leading surface and a paddle trailing surface. The cupped paddle may generate turbulence and cavitation upon alternatingly entering and exiting the body of water as the impeller is rotated by the motor. Visual and audible side effects of the turbulence and cavitation may be simulative of fish feeding activity. The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the fish attraction device, and is not intended to represent the only form in which it can be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, distal, proximal, and the like are used solely to distinguish one from another entity without necessarily requiring or implying any actual such relationship or order between such entities.

Figure 1:
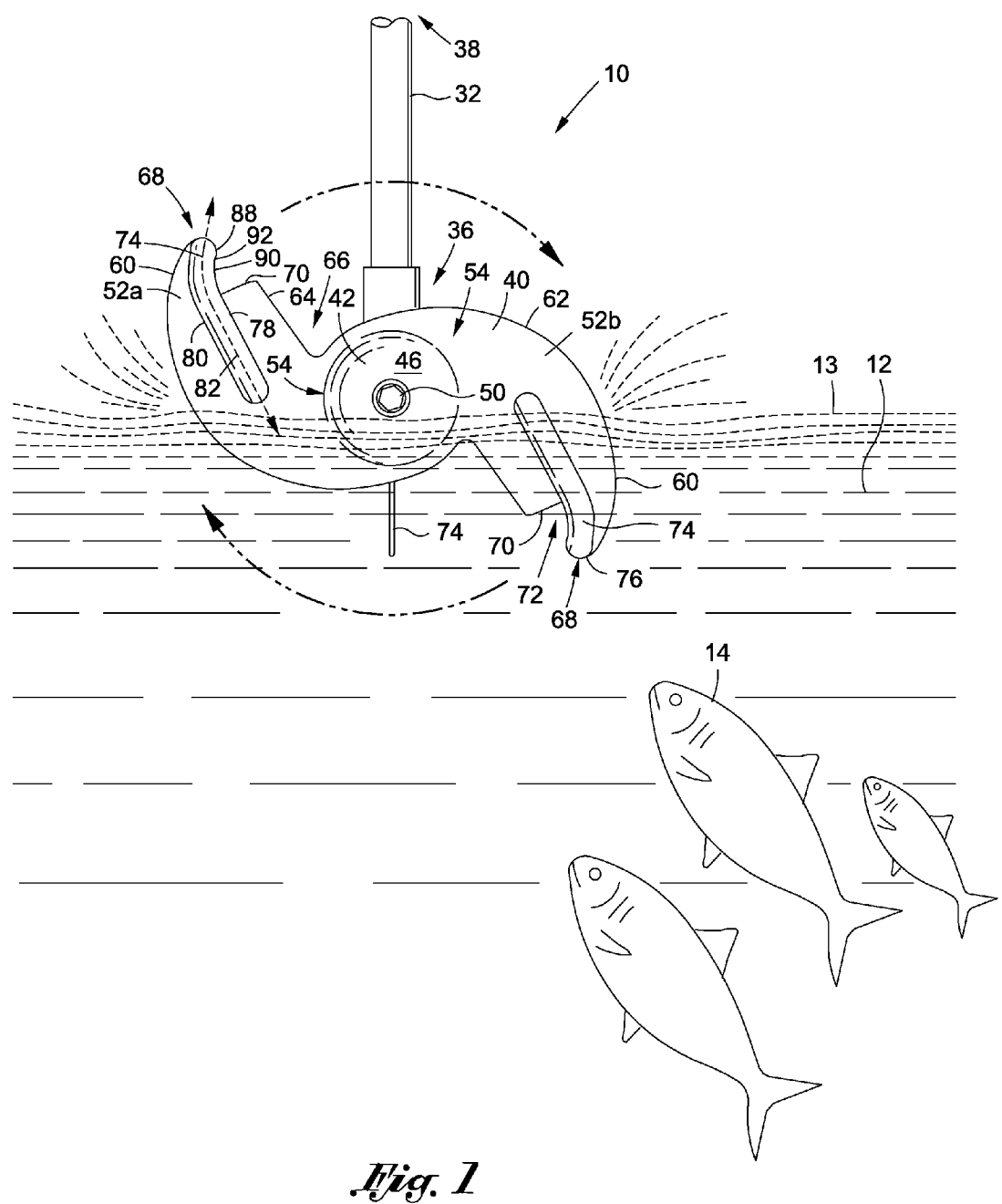
FIG. 1 is a frontal view of a fish attraction device in accordance with one embodiment of the present disclosure, shown in an environment attracting fish.

FIG. 1 depicts a first embodiment of a fish attraction device 10 being operated in a body of water 12 to attract fish 14. With additional reference to FIG. 2, the fish attraction device 10 is generally comprised of a motor 16 that is enclosed within a housing 18. The motor 16 includes a rotating driveshaft 20 that defines a rotational axis r and extends from the housing 18. In its normal operating state, the rotational axis r of the driveshaft 20 is substantially parallel to a surface or water line 13 of the body of water 12.

Because the fish attraction device 10 is contemplated to be at least partially submersible, the housing 18 may be sealed. The housing 18 has an elongate cylindrical configuration with a front end 22 and an opposed back end 24 that defines an opening for the driveshaft 20. On a bottom portion 26 of the housing 18, toward its front end 22, there may be a vertical stabilizer 28, also referred to as a skeg. Opposite the bottom portion 26, there is a top portion 30 that includes a support rod 32. According to one embodiment, the housing 18 defines a support rod collar 34 that receives a first end 36 of the support rod 32. In further detail, the support rod 32 and the housing 18 to which it is attached may be rotatable to orient the back end 24 in any desired location. The housing 18, along with the various components attached thereto, is understood to be suspended and partially submerged within the body of water 12. To this end, a second end 38 of the support rod 32 may be secured to a structure such as a transom or a gunwale of a boat with sufficient vertical offset to allow for the housing 18 to be suspended partially submerged in the body of water 12 as shown in FIG. 1. Due to the potential variances in the freeboard height, the support rod 32 is understood to have an adjustable length.

As will be appreciated by those having ordinary skill in the art, the housing 18, the motor 16 enclosed therein, and the support rod 32 are part of a re-purposed trolling motor that can be secured to a fishing boat. In general, these devices may be referred to as a secondary outboard motor used for slow, quiet and more precise movement in all directions during angling. In this regard, the motor 16 may be electrically driven with batteries that are located on the vessel. The rotation speed is controllable via a remote unit connected to the motor 16 and accessible from the deck of the vessel. Depending on the operational characteristics of the motor 16, varying current and voltage levels from the battery may be utilized to operate the same at different rotation speeds. Connective wiring for both the battery and the remote unit may be routed through the support rod 32. Although there are numerous variations as to size and output power of trolling motors, one exemplary implementation uses a 75 horsepower motor. It will be recognized by those having ordinary skill in the art that any suitable alternative may be substituted without departing from the scope of the present disclosure.

Figure 2:
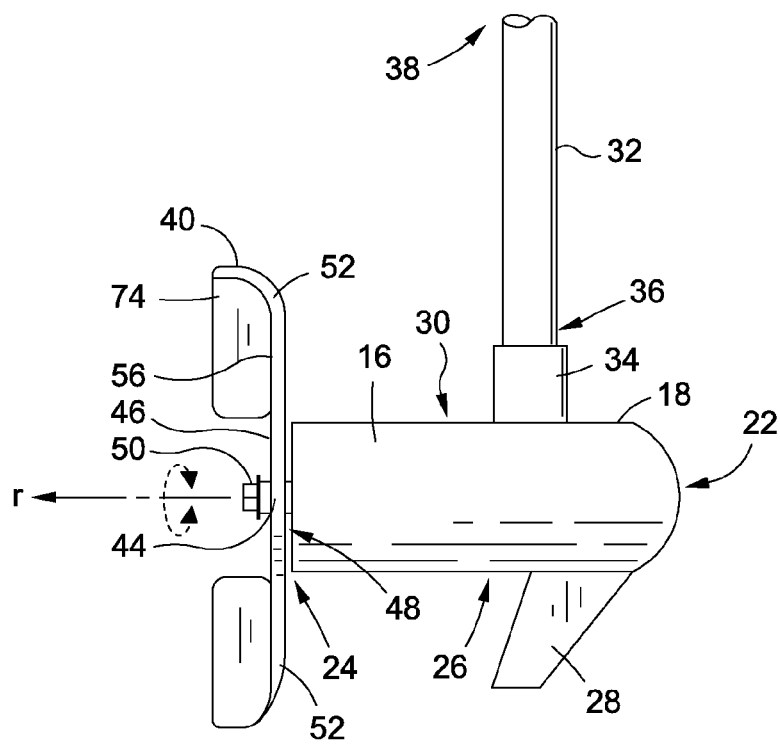
FIG. 2 is a side view of the fish attraction device.
Figure 3:
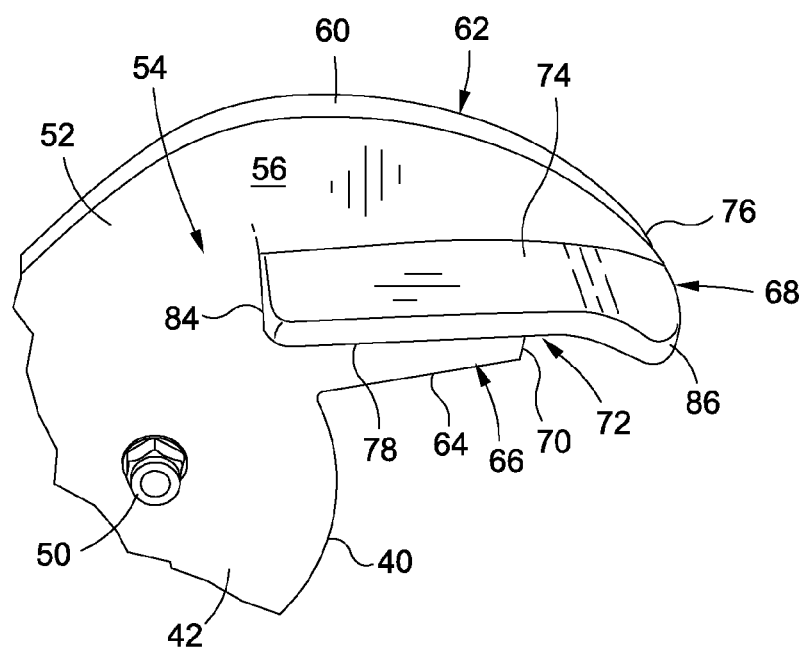
FIG. 3 is a detailed perspective view of an impeller utilized in connection with a first embodiment of the fish attraction device shown in FIG. 1 and FIG. 2.

The fish attraction device 10 also includes an impeller 40, a first embodiment 40a thereof being shown in FIG. 1, FIG. 2, and FIG. 3. As will be described more fully below, the impeller 40a is understood to generate turbulence in the body of water 12 as it is rotated. The turbulence produces cavitation, which is the formation and rapid implosion of air bubbles in the water. The collapse of these bubbles produces shockwaves that result in visual and audible side effects that are understood to simulate feeding activity by fish. This, in turn, is understood to attract the fish 14, tricking them to believing that there is nourishment to be had in the vicinity of the turbulence. The turbulence and resultant shock waves go beyond simple acoustics. Actual tests have shown that this technique for attracting fish is most successful with schooling types such as striped bass, though it is contemplated that any other type will similarly be attracted. Moreover, weather and other environmental conditions in the body of water 12 that closely correlate to typical feeding conditions of the targeted fish also understood to correlate with the effectiveness of attracting the fish 14. For instance, certain species of the fish 14 may be more attracted in colder temperatures.

The specific arrangement of the cavitation-producing elements of the impeller 40 are understood to generate a rhythmic, "pop-pop-pop-pop" type sound, with the rotation speeds being increased or decreased to correspondingly decrease or increase the intervals of time between "pops." According to one preferred, though optional embodiment of the present disclosure, the motor is operated at 150 revolutions per minute (RPM), which in the embodiment with two opposed elements of the impeller 40, translates to approximately 300 beats or "pops" per minute.

The first embodiment of the impeller 40a includes a hub 42 with a center 44 that is in axial alignment with the driveshaft 20. The hub 42 is defined by a front face 46 and an opposed rear face 48. Additionally, the center 44 is characterized by an opening, through which the driveshaft 20 is inserted. The driveshaft may have a threaded end receptive to a nut 50 that couples and secures the hub 42, and thus the impeller 40a, to the driveshaft 20.

The impeller 40a additionally has a first flat planar blade 52a that extends radially from the hub 42, as well as a second flat planar blade 52b that similarly extends radially from the hub 42. The first flat planar blade 52a and the second flat planar blade 52b may be collectively referred to as the flat planar blades 52. According to one embodiment, the flat planar blades 52 radially extend in an opposed relation to each other, that is, they are in a spaced relationship around the hub 42 about the center 44 with an angular offset of 180 degrees.

The flat planar blades 52 each define a proximal end 54 that is fixed to the hub 42. It is expressly contemplated that the flat planar blades 52 and the hub 42 are integrally formed, so reference to one element being fixed to another element is not intended to be limiting. There is minimal consequence to the specific boundary of where one element ends and the other begins, and it is sufficient that the impeller 40a is comprised several different generally defined parts.

Like the hub 42, the flat planar blades 52 also have a front surface 56 and an opposed rear surface 58. The flat planar blades 52 are understood to be in an orthogonal, i.e., perpendicular relationship to the rotational axis r of the driveshaft 20 as particularly shown in FIG. 2. In this regard, the flat planar blades 52 have no pitch or an angle of attack relative to the rotational axis r in order to minimize forward thrust while operating the fish attraction device 10.

The flat planar blades 52 may be balanced or unbalanced with respect to each other. Balanced means that the cumulative weight of the first flat planar blade 52a any additional components appurtenant thereto, may be substantially the same as the cumulative weight of the second flat planar blade 52 including any of its appurtenant components. This is understood to generate a constant rhythm of shockwaves/sounds as discussed above. With unbalanced flat planar blades, the generated shockwaves/sounds may alternate in volume and/or pitch due to the different weights associated with each.

Although the illustrated example shows a pair of flat planar blades 52, this is not intended to be limiting. For instance, some embodiments may incorporate just one flat planar blade 52. Other alternative embodiments may incorporate three or more flat planar blades 52. In general, various embodiments contemplate one or more flat planar blades 52.

As best illustrated in FIG. 1 and FIG. 3, the flat planar blade 52 is defined by a trailing edge 60 that is initially tangent with the circular definition of the hub 42, but has a curvature or an arcuate segment 62. Furthermore, the flat planar blade 52 is defined by a leading edge 64 with a linear segment 66 extending from the proximal end 54 fixed to or otherwise integral with the hub 42. The trailing edge 60 and the leading edge 64 converge upon a tip 68 of the flat planar blade 52.

In the first embodiment of the impeller 40a, the leading edge 64 has an orthogonal segment 70 which, together with the leading edge 64, defines a notch 72. This is understood to maximize directional water flow against a cupped paddle 74 that projects from the flat planar blade 52. In further detail, the cupped paddle 74 defines a paddle leading surface 78 and an opposed paddle trailing surface 80. As shown in FIG. 1, the paddle leading surface 78 is coincident with at least a portion of the leading edge 64 of the flat planar blade 52. More particularly, the cupped paddle 74 projects from the front surface 56 of the flat planar blade 52 and extends along its medial axis 82. That is, the cupped paddle 74 is disposed in a central region of the flat planar blade 52 that is between the trailing edge 60 and the leading edge 64. However, it is also possible for the cupped paddle 74, and the trailing surface 80 thereof, to be coincident with the trailing edge 60 of the flat planar blade 52. The cupped paddle 74 may be integrally formed with the flat planar blade 52, or in the alternative, separately attached to the same.

In the first embodiment of the impeller 40a, the cupped paddle 74 is defined by a first end 84 that is proximal to the hub 42, and a second end 86 that is coincident with a distal end 76 of the flat planar blade 52, as well as the tip 68. At the second end 86, the cupped paddle 74, and more particularly the paddle leading surface 78, is arcuate, i.e., curved. In the embodiment shown, there is a first surface segment 88 and a second surface segment 90 that are joined obliquely relative to each other at a joint 92. This is understood to define the cup that generates the turbulence and cavitation as the impeller 40a rotates and enters the body of water 12. The splashes generated by outgoing cupped paddle 74 are also understood to contribute to the shockwaves that simulate feeding fish.

Along these lines, as best shown in FIG. 1, the center 44 of impeller 40a, and hence the motor 16 and the housing 18, may be positioned slightly above or below the water line 13, or at least in a way in which contact time of the water is maximized. In so doing, it is understood that a greater amount of turbulence and cavitation, and hence shockwaves, can be generated to increased effect in attracting the fish 14. The specific positioning may be varied according to the particular conditions during operation, and those having ordinary skill in the art will be able to make adjustments in response to the activity or a lack thereof on the part of the fish 14.

Figure 4:
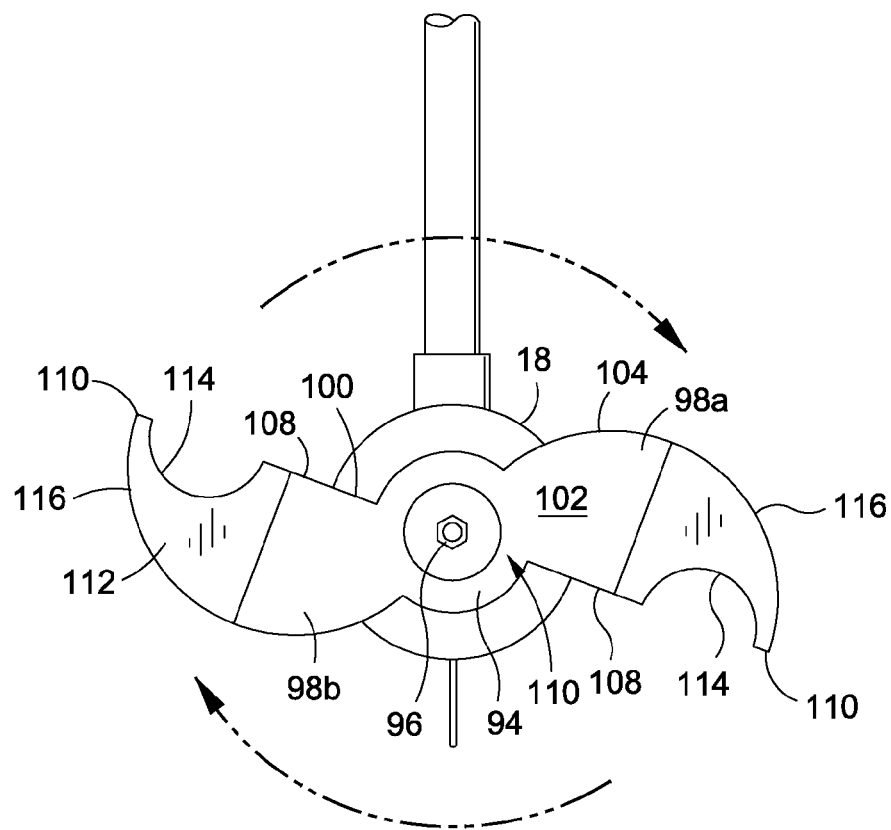
FIG. 4 is a front view of another impeller utilized in connection with a second embodiment of the fish attraction device.
Figure 5:
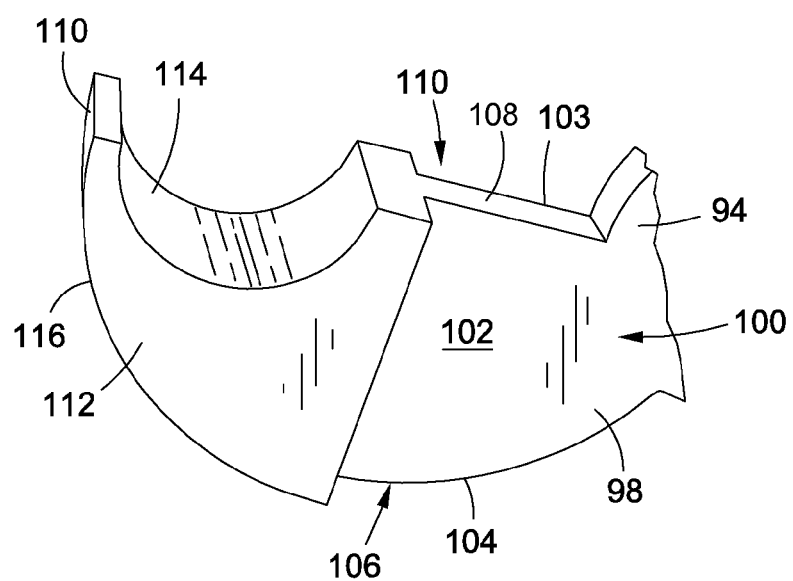
FIG. 5 is a detailed perspective view of the impeller shown in FIG. 4.

With reference to FIG. 4 and FIG. 5, the present disclosure also contemplates a second embodiment of the impeller 40b. The operational characteristics thereof are similar to that of the first embodiment 40a discussed above, but there are several variations that will be discussed in more detail below. Again, the impeller 40b is understood to generate turbulence in the body of water 12 as it is rotated. Similar to the first embodiment 40a, there is a hub 94 with a center 96 that is in axial alignment with the driveshaft 20. The center 96 and an opening defined thereby are receptive to the driveshaft 20. The nut 50 likewise couples and secures the hub 94, and thus the impeller 40b, to the driveshaft 20.

The impeller 40b has an alternately configured first flat planar blade 98a that extends radially from the hub 94 and a second flat planar blade 98b that also extends radially from the hub 94, both of which are collectively referred to as the flat planar blades 98. The illustrated example of the pair of flat planar blades 98 is not intended to be limiting. The flat planar blades 98 radially extend in an opposed relation to each other, that is, they are in a spaced relationship around the hub 94 about the center 96. Further, the flat planar blades 98 each define a proximal end 100 that is fixed to the hub 94. As referenced to describe the second embodiment of the impeller 40b, fixed may refer to integrally formed variations, as well as separately attached variations.

The flat planar blades 98 have a front surface 102 and an opposed rear surface 103. The flat planar blades 98 are understood to be in an orthogonal, i.e., perpendicular relationship to the rotational axis r of the driveshaft 20. Again, the flat planar blades 98 have no pitch or an angle of attack relative to the rotational axis r in order to minimize forward thrust while operating the fish attraction device 10.

The flat planar blade 98 is defined by a trailing edge 104 that has an arcuate or semicircular segment 106. The flat planar blade 98 is additionally defined by a leading edge 108 with a linear segment 110 extending from the proximal end 100 fixed to or otherwise integral with the hub 94. The trailing edge 104 and the leading edge 108 converge upon a tip 110 of the flat planar blade 98.

The second embodiment of the impeller 40b has a differently configured cupped paddle 112, though it likewise has a paddle leading surface 114 and an opposed paddle trailing surface 116.

The paddle leading surface 114 is coincident with the leading edge 108 of the flat planar blade 98, while the paddle trailing surface 116 is also coincident with the trailing edge 104. The cupped paddle 112 projects from both the front surface 102 as well as the opposed rear surface 103 of the flat planar blade 98. In other words, the cupped paddle 112 may simply be a section of the flat planar blade 98 that has a greater thickness. The cupped paddle 112 accordingly defines a cup that generates the turbulence and cavitation as the impeller 40b rotates and enters and exits the body of water 12.

The particulars shown herein are by way of example and for purposes of illustrative discussion of the embodiments of the present invention only and are presented in the cause of providing what is believed to be the most useful and readily understood description of the principles and conceptual aspects of the fish attraction device 10. In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. An apparatus for attracting fish, comprising:
a motor including a rotating driveshaft defining a rotational axis substantially parallel to a surface of a body of water when deployed in the body of water;
a housing enclosing the motor with the driveshaft extending therefrom;
an impeller with a hub axially aligned with and coupled to the driveshaft, one or more flat planar blades each defined by a trailing edge and a leading edge and extending radially from the hub in an orthogonal relationship to the rotational axis of the driveshaft without pitch and having a proximate end fixed to the hub and an opposed distal end with a cupped paddle projecting from each of the one or more flat planar blades and defining a paddle leading surface and a paddle trailing surface; and
a support rod directly engaged to the housing in a fixed substantially orthogonal relationship to the rotational axis of the motor driveshaft and the surface of the body of water when deployed in the body of water;
wherein the housing, motor, and impeller are maintainable in partial submersion in the body of water by being suspended from the support rod during operation in the body of water, and the cupped paddle generates turbulence and cavitation upon alternatingly entering and exiting the body of water as the impeller is rotated by the motor, visual and audible side effects of the turbulence and cavitation being simulative of fish feeding activity.

2. The apparatus of claim 1, wherein the one or more flat planar blades comprises a pair of flat planar blades which are in opposed radial extension to each other.

3. The apparatus of claim 2, wherein the pair of flat planar blades are unbalanced with respect to each other.

4. The apparatus of claim 1, wherein:
the trailing edge of each of the one or more flat planar blades defines an arcuate segment; and
the leading edge of each of the one or more flat planar blades defines a linear segment.

5. The apparatus of claim 1, wherein each of the one or more flat planar blades defines a front surface and a rear surface.

6. The apparatus of claim 5, wherein the cupped paddle projects from the front surface of each of the one or more flat planar blades along a medial axis thereof.

7. The apparatus of claim 6, wherein the leading edge of each of the one or more flat planar blades is coincident with at least a portion of the paddle leading surface.

8. The apparatus of claim 6, wherein the cupped paddle extends along a central region of each of the one or more flat planar blades between the trailing edge and the leading edge thereof.

9. The apparatus of claim 6, wherein the cupped paddle is defined by a first end proximal to the hub and a second end proximal to the distal end of each of the one or more flat planar blades.

10. The apparatus of claim 5, wherein the cupped paddle projects from both the front surface and the rear surface of each of the one or more flat planar blades.

11. The apparatus of claim 10, wherein the paddle trailing surface is coincident with the trailing edge of each of the one or more flat planar blades.

12. The apparatus of claim 11, wherein the paddle leading surface is coincident with the leading edge of each of the one or more flat planar blades.

13. The apparatus of claim 1, wherein the paddle leading surface is arcuate.

14. The apparatus of claim 1, wherein the paddle leading surface includes a first surface segment and a second surface segment joined obliquely relative to each other.

15. The apparatus of claim 1, wherein:
the housing is rotatably mounted to the support rod; and
the support rod has an adjustable length that accommodates variable freeboard heights for suspending the housing, the motor, and the impeller partially submersed.

16. The apparatus of claim 1, wherein the motor is electric and a rotation speed thereof is remotely controllable by applying a variable electric power thereto.

17. The apparatus of claim 1, further comprising:
a vertical stabilizer fin attached to the housing.

* * * * *